(12) United States Patent
Zeiler et al.

(10) Patent No.: US 12,174,509 B2
(45) Date of Patent: Dec. 24, 2024

(54) OPTICAL WAVEMETER

(71) Applicant: Keysight Technologies, Inc., Santa Rosa, CA (US)

(72) Inventors: Marcel Zeiler, Boeblingen (DE); Bernd Nebendahl, Ditzingen (DE)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 313 days.

(21) Appl. No.: 17/874,513

(22) Filed: Jul. 27, 2022

(65) Prior Publication Data

US 2022/0365400 A1 Nov. 17, 2022

Related U.S. Application Data

(63) Continuation-in-part of application No. 16/943,056, filed on Jul. 30, 2020, now Pat. No. 11,536,610.
(Continued)

(51) Int. Cl.
*G02B 6/293* (2006.01)
*G02F 1/21* (2006.01)
(Continued)

(52) U.S. Cl.
CPC ............ *G02F 1/212* (2021.01); *G02B 6/2935* (2013.01); *G02B 6/29352* (2013.01); *G02F 1/225* (2013.01); *G02B 6/12007* (2013.01)

(58) Field of Classification Search
CPC ........................ G02B 6/2935; G02B 6/29352
See application file for complete search history.

(56) References Cited

U.S. PATENT DOCUMENTS 5,333,219 A * 7/1994 Kuznetsov ............ G02F 1/2257
359/344
6,661,361 B1 12/2003 Lewis et al.
(Continued)

FOREIGN PATENT DOCUMENTS

CN 105826811 A 8/2016
CN 106371261 A 2/2017
(Continued)

OTHER PUBLICATIONS

German Office Action dated Dec. 14, 2023 for application No. 102020213645.9, with English translation, 10 pgs.
(Continued)

*Primary Examiner* — Charlie Y Peng

(57) ABSTRACT

An optical device having a wavelength measurement section and an SMRS measurement section is disclosed. The wavelength measurement section includes a MZI, which includes first optical waveguides having a first optical path length difference. The wavelength measurement section also includes a second MZI, which includes second optical waveguides having a second optical path length difference. The second optical path length difference is greater than the first optical path length difference. The SMRS includes a filter adapted to suppress a primary laser mode of the second output optical signal and to pass a remaining portion of the second output signal to determine an SMRS based on an optical power of the main laser mode from the wavelength and power measurement stage, and an optical power of the remaining portion of the second output optical signal.

20 Claims, 6 Drawing Sheets

Related U.S. Application Data

(60) Provisional application No. 62/928,704, filed on Oct. 31, 2019.

(51) Int. Cl.
*G02F 1/225* (2006.01)
*G02B 6/12* (2006.01)

(56) References Cited

U.S. PATENT DOCUMENTS

| | | | |
|---|---|---|---|
| 6,781,741 B2 | 8/2004 | Uesaka | |
| 6,823,094 B2 | 11/2004 | Goh et al. | |
| 8,406,580 B2 | 3/2013 | Takada et al. | |
| 9,104,085 B2 | 8/2015 | Wesstrom | |
| 10,082,628 B2 | 9/2018 | Sugiyama | |
| 10,145,731 B2 | 12/2018 | Qian et al. | |
| 10,530,119 B2 | 1/2020 | Takabayashi et al. | |
| 11,536,610 B2 | 12/2022 | Zeiler et al. | |
| 11,953,320 B2 | 4/2024 | Nakamura | |
| 2002/0149780 A1 | 10/2002 | Trinh | |
| 2002/0181870 A1 | 12/2002 | Inoue et al. | |
| 2003/0021304 A1 | 1/2003 | Pezeshki et al. | |
| 2014/0341582 A1* | 11/2014 | Lunardi | H04J 14/0307 398/79 |
| 2021/0131873 A1 | 5/2021 | Zeiler et al. | |

FOREIGN PATENT DOCUMENTS

| | | |
|---|---|---|
| DE | 102020213645 A1 | 5/2021 |
| EP | 1850170 A1 | 10/2007 |
| JP | H08251105 A | 9/1996 |
| JP | 2003501696 A | 1/2003 |
| JP | 2008177759 A | 7/2008 |
| JP | 2017223738 A | 12/2017 |
| JP | 2019033156 A | 2/2019 |
| JP | 2021071726 A | 5/2021 |
| WO | 03063515 A2 | 7/2003 |
| WO | 2017201548 A1 | 11/2017 |
| WO | 2019189559 A1 | 10/2019 |

OTHER PUBLICATIONS

Non-Final Office Action dated Jul. 8, 2022 for U.S. Appl. No. 16/943,056, 16 pgs.
Notice of Allowance dated Sep. 1, 2022 for U.S. Appl. No. 16/943,056, 8 pgs.
English translation of CN105826811A, 8 pgs.
English translation of CN106371261A, 14 pgs.
Fabio Pavanello et al. "Broadband Digital Fourier Transform Spectrometer for On-Chip Wavelength Monitoring in the 2.3-µm Wavelength Range," IEEE Photonics Journal, vol. 11, No. 3, Jun. 2019, pp. 1-10.
Derek M. Kita et al., "High-performance and scalable on-chip digital Fourier transform spectroscopy," Nature Communications, 2018, DOI: 10.1038/s41467-018-06773-2 | www.nature.com/naturecommunications, pp. 1-7.
R. M. Oldenbeuving et al., "High precision wavelength estimation method for integrated optics," Optical Society of America, 2013, vol. 21, No. 14, DOI: 10.1364/OE.21.017042, pp. 17042-17052.
Chao Xiang et al., Integrated chip-scale Si3N4 wavemeter with narrow free spectral range and high stability, Optic Letters, vol. 41, No. 14, Jul. 15, 2016, pp. 3309-3312.
Przemek J. Bock et al.,"Subwavelength grating Fourier-transform interferometer array in silicon-on-insulator," Laser Photonics Rev. 7, No. 6, L67-L70 (2013) / DOI 10.1002/lpor.201300063, pp. 67-70.
Babak Momeni et al., "Planar photonic crystal microspectrometers insilicon-nitride for the visible range," Optics Express, Sep. 14, 2009, vol. 17, No. 19, pp. 17060-17069.
"Keysight 86120D and 86122C Multi-Wavelength Meters—Data Sheet," Keysight Technologies, Dec. 1, 2016, pp. 1-8.
M. Muneeb et al., "Demonstration of Silicon-on-insulator midinfrared spectrometers operating at 3.8µm," Optics Express, May 20, 2013, vol. 21, No. 10, pp. 11659-11669.
"Tunable Laser Platform," Luna, Dec. 13, 2017, http:/lunainc.com/phoenix, pp. 1-2.
S. N. Zheng et al., "On-chip Spectrometer Enhanced by Ring Resonator Cavity: High-resolution and Large-bandwidth," CLEO 2017 © OSA 2017, pp. 1-2.
Japanese Office Action dated Jun. 28, 2024, Application No. 2020-182358, 9 pgs.
German R. Varas, "A Dual Mach-Zehnder Interferometer Wavelength Measurement Device using Silicon over Insulator Technology," 2016 IEEE 7th Annual Information Technology, Electronics and Mobile Communication Conference (IEMCON), Vancouver, BC, Canada, 2016, pp. 1-4.

* cited by examiner

OPTICAL WAVEMETER

CROSS-REFERENCE TO RELATED APPLICATIONS

The present application is a continuation-in-part under 37 C.F.R § 1.53(b) of U.S. patent application Ser. No. 16/943,056 (now issued as U.S. Pat. No. 11,536,610) filed on Jul. 30, 2022. Priority is claimed under 35 U.S.C. § 120 from U.S. patent application Ser. No. 16/943,056. This application further claims priority under 35 U.S.C. § 119(e) from U.S. Provisional Application 62/928,704 filed on Oct. 31, 2019, which names Marcel Zeiler, et al. as inventors. The entire disclosures of U.S. patent application Ser. No. 16/943, 056 and U.S. Provisional Application 62/928,704 are specifically incorporated herein by reference.

BACKGROUND

Knowing the wavelength of an optical signal is important when analyzing a signal of an unknown optical source, but also when the output of a (tunable) laser source must be conditioned according to pre-defined parameters, such as the wavelength.

Optical wavemeters allow the measurement of a wavelength of an optical source, often a narrowband optical source such as a laser. These optical wavemeters have practical applications such as continuous or continual monitoring of the wavelength of an optical source. Additionally, optical wavemeters have application in optical spectrum analyzers or wavelength-meters to provide a way to measure the wavelength of a reference signal and thus increase the accuracy of the actual measurement.

In addition, it is often useful to determine the output power and side mode suppression ratio (SMSR) of a tunable lasers. These parameters are typically measured during the production of the tunable laser and sometimes during the production of the systems including the tunable laser. Depending on the application, such as in an optical communication system operating at a comparatively high bit data rate, the accuracy of the measurement of these parameters is stringent.

Known devices used to determine the output wavelength, the output power and the SMSR of a tunable laser requires a separate instrument for each measure. Known methods rely on a multi-wavelength meter to measure the wavelength; and a power meter to measure the power. Measurement of the SMSR by known methods generally relies upon a spectrum analyzer. Notably, a spectrum analyzer is not accurate enough to measure the operating wavelength, the output power of the tunable laser and the SMSR. As such, by known methods, the measurement of these operating parameters of a tunable laser thus requires three instruments, which expensive and comparatively slow in determining these parameters.

What is needed, therefore, is an optical wavemeter that overcomes at least the shortcomings of known optical wavemeters discussed above.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
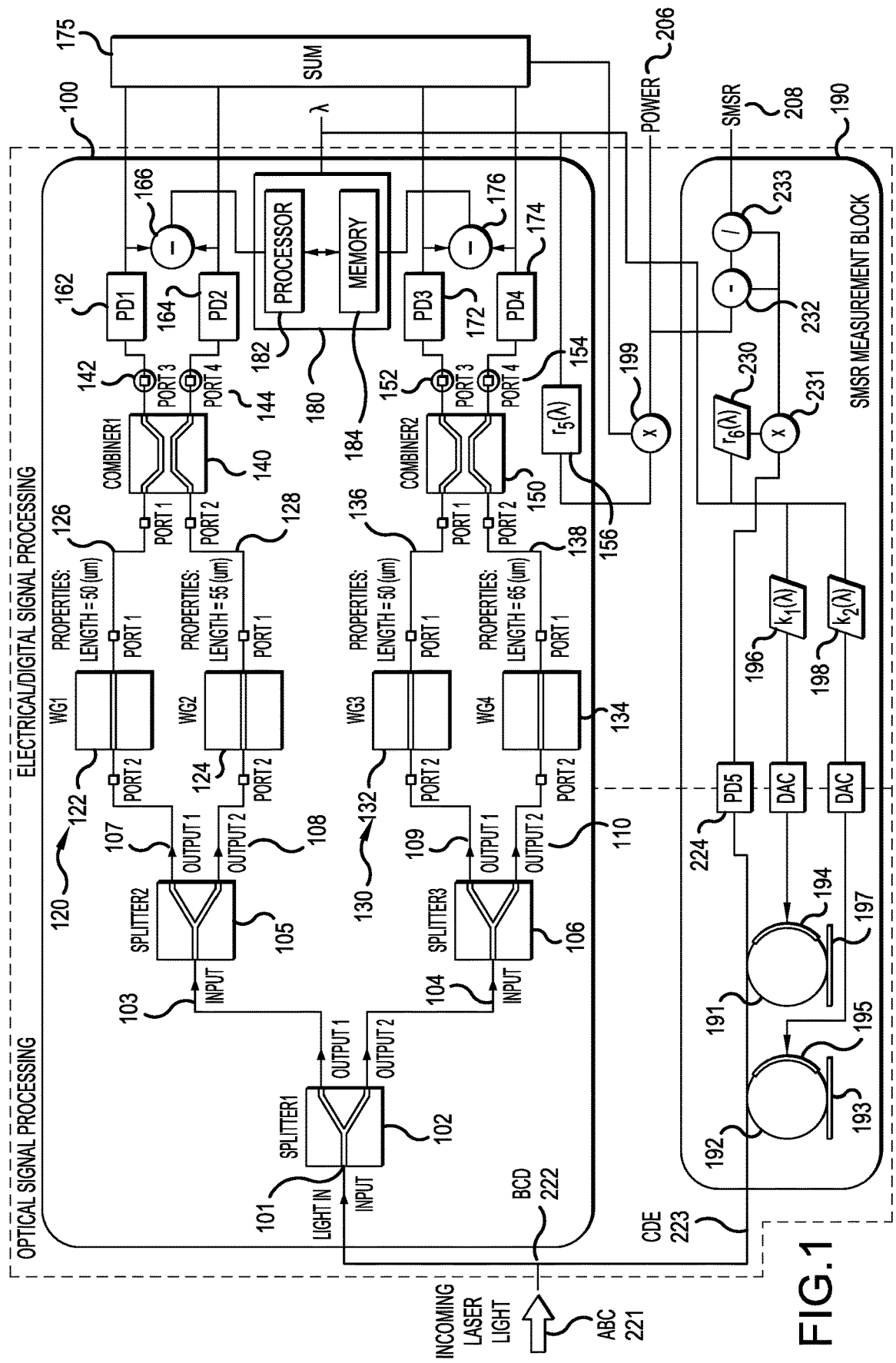
FIG. 1 is a simplified schematic diagram of an optical wavemeter an optical wavelength in accordance with a representative embodiment.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

Unless otherwise noted, when a first element (e.g., an optical waveguide) is said to be connected to a second element (e.g., another optical waveguide), this encompasses cases where one or more intermediate elements or intervening devices may be employed to connect the two elements to each other. However, when a first element is said to be directly connected to a second element, this encompasses only cases where the two elements are connected to each other without any intermediate or intervening devices. Similarly, when a signal is said to be coupled to an element, this encompasses cases where one or more intermediate elements may be employed to couple the signal to the element. However, when a signal is said to be directly coupled to an element, this encompasses only cases where the signal is directly coupled to the element without any intermediate or intervening devices.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements' relationships to one another, as illustrated in the accompanying drawings. These relative terms are intended to encompass different orientations of the elements thereof in addition to the orientation depicted in the drawings. For example, if an apparatus (e.g., an optical wavemeter) depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

Various embodiments of an optical wavemeter adapted to measure an output wavelength, output power and SMSR are described herein.

In accordance with a representative embodiment, an apparatus for determining a wavelength, a power, and a side-mode suppression ratio of an input signal of an input signal is disclosed. The apparatus comprises: a first optical splitter adapted split power of the input optical signal into a first output optical signal and a second output optical signal; a second optical splitter connected to a first arm of the first optical splitter, and adapted to split the first output optical signal into a third output optical signal and a fourth optical signal; a wavelength and power measurement stage connected to the second output optical splitter, the wavelength and power measurement stage comprising: a first Mach-Zehnder Interferometer (MZI) disposed over the substrate, comprising first optical waveguides having a first effective index of refraction and configured to receive the third output optical signal from a light source; and a second Mach-Zehnder Interferometer (MZI) disposed over the substrate, comprising second optical waveguides having a second effective index of refraction, which is greater than the first effective index of refraction, and configured to receive the fourth output optical signal from the light source, wherein the first MZI has a first optical path length (OPL) difference, the second MZI has a second optical path length (OPL) difference, which is greater than the first OPL difference; and a side mode suppression stage adapted to receive the second output optical signal, the side mode suppression stage comprising: a filter adapted to suppress a primary laser mode of the second output optical signal and to pass a remaining portion of the second output signal to determine a side mode suppression ratio (SMRS) based on an optical power of the main laser mode from the wavelength and power measurement stage, and an optical power of the remaining portion of the second output optical signal.

In accordance with another representative embodiment, an optical wavemeter for determining an optical wavelength a power, and a side-mode suppression ratio of an input signal of a light source is disclosed. The optical wavemeter comprises: a first optical splitter adapted split power of the input optical signal into a first output optical signal and a second output optical signal; a second optical splitter connected to a first arm of the first optical splitter, and adapted to split the first output optical signal into a third output optical signal and a fourth optical signal; a wavelength and power measurement stage connected to the second output optical splitter, the wavelength and power measurement stage comprising: a first Mach-Zehnder Interferometer (MZI) disposed over the substrate, comprising first optical waveguides having a first optical path length difference, and configured to receive a first output optical signal from a light source; a second Mach-Zehnder Interferometer (MZI) disposed over the substrate, comprising second optical waveguides having a second optical path length difference, which is greater than the first optical path length difference, and configured to receive a second output optical signal from the light source; a first photodetector and a second photodetector, wherein a first difference signal is provided based on first outputs of the first MZI; a third photodetector and a fourth photodetector, wherein a second difference signal is provided based on second outputs of the second MZI; a side mode suppression stage adapted to receive the second output optical signal, the side mode suppression stage comprising: a filter adapted to suppress a primary laser mode of the second output optical signal and to pass a remaining portion of the second output signal; and a controller comprising a memory that stores instructions, and a processor that executes the instructions, wherein, when executed by the processor, the instructions cause the controller to: compare the first and second difference signals with first and second difference values stored in the memory, and, based on the comparing, determine an output wavelength of the light source; and determine a side mode suppression ratio (SMRS) based on an optical power of the main laser mode from the wavelength and power measurement stage, and an optical power of the remaining portion of the second output optical signal; determining the SMRS.

Notably, the apparatuses and wavemeters of the present teachings offer, a single device (e.g., a photonic integrated circuit (PIC) that overcome drawbacks of known structures comprising multiple devices to measure wavelength, power and SMSR of a laser under test. The apparatuses of the present teachings provide requisite accuracy of these measurements, and in a comparatively quick manner. Notably, the accuracy of the devices of the present teachings have accuracy for wavelength measurement greater than a picometer (i.e., sub-picometer accuracy) and power accuracy greater than a dB (i.e., sub-dB). Beneficially, therefore, the apparatuses and wavemeters of the present teachings provide a single test instrument (e.g., disposed on a PIC) for measuring a laser's emission wavelength, SMSR and optical power. This test instrument can save laser manufacturers the expense and complexity of requiring a plurality of instruments to measure these same parameter. Moreover, the time to carry out the measurements of the laser's emission wavelength, SMSR and optical power is also significantly reduced because there is no need to switch the laser signal between different instruments of the known multiple instrument laser testing methods. Finally, while various aspects of the representative embodiments are directed at measurements of the noted parameters during manufacture of tunable lasers, other applications are contemplated. For example, the apparatuses and wavemeters of the present teachings are anticipated for monitoring the wavelength, output power and SMSR in high bit-rate optical transmitters to improve their operation when deployed.

FIG. 1 is a simplified schematic diagram of a wavemeter section 100 and an SMSR measurement section 190, of an apparatus for measuring the wavelength, output power and SMSR of a laser in accordance with a representative embodiment. As described more fully below, the wavemeter section 100 is contemplated for instantiation as a photonic integrated circuit (PIC).

An input optical signal is provided to an input 101 as shown. A first optical splitter 102 is adapted to split the power of the input optical signal into a first optical signal 103 and a second optical signal 104, having equal power. As such, the first optical splitter is a 50:50 optical splitter.

The first optical signal 103 is then incident on a second optical splitter 105, and the second optical signal 104 is incident on a third optical splitter 106. Like the first optical splitter 102, the second and third optical splitters 105, 106 are each 50:50 splitters, and as such, the input optical signal is again equally split by the second and third optical splitters 105, 106. The second optical splitter 105 provides a first output optical signal 107 and a second output optical signal 108. Similarly, the third optical splitter 106 provides a third output optical signal 109 and a fourth output optical signal 110. As will be appreciated, neglecting power loss in optical waveguides and couplers, each of the first, second, third and fourth optical output signals have one-fourth of the optical power of the input optical signal provided to the input 101.

The first output optical signal 107 is received at a first port of a first arm 122 of a first Mach-Zehnder interferometer (MZI) 120; and the second output optical signal 108 is received at a second port of a second arm 124 of the first MZI 120.

Similarly, the third output optical signal 109 is received at a first port of a first arm 132 of a second Mach-Zehnder interferometer (MZI) 130; and the fourth output optical signal 110 is received at a second port of a second arm 134 of the second MZI 130.

The first MZI 120 has a first free-spectral range (FSR), and the second MZI 130 has a second free spectral range, which is different than the first FSR of the first MZI 120. As will be described more fully below, the FSRs of the first and second MZIs 120, 130 are realized by providing a first effective index of refraction for the first MZI 120, and a second effective index of refraction for the second MZI 130, which is not the same as the first effective index of refraction. In addition, or instead of the providing different effective indices of refraction, the first MZI 120 may have a first geometric optical length (i.e., physical length) and the second MZI 130 may have a second geometric optical length, which is different than the first geometric optical length. As described more fully below, the differing FSRs are used to determine a wavelength of the input optical signal.

A first output 126 and a second output 128 are provided from the first and second arms 122, 124 of the first MZI 120 to first and second inputs of a first signal combiner 140, which provides a first output 142 to a first photodetector 162 and a second output 144 to a second photodetector 164. The outputs of the first and second photodetectors 162, 164 are provided to a first subtractor 166. Moreover, and as shown in FIG. 1, the outputs of the first and second photodetectors 162, 164 are provided to a summer 175 and to the SMSR measurement section 190 as described more fully below. As shown, the output of the first subtractor 166, which is a difference signal (power) between the first and second photodetectors 162, 164 is provided as a first input to a controller 180, which comprises a processor 182 and a memory 184.

A first output 136 and a second output 138 are provided from the first and second arms 132, 134 of the second MZI 130 to first and second inputs of a second signal combiner 150, which provides a first output 152 to a first photodetector 172 and a second output 154 to a second photodetector 174. The outputs of the first and second photodetectors 172, 174 are provided to a second subtractor 176. As shown, the output of the second subtractor 176, which is a difference signal (power) between the first and second photodetectors 172, 174 is provided as a second input to the controller 180. Moreover, and as shown in FIG. 1, the outputs of the first and second photodetectors 172, 174 are provided to a summer 175 and to the SMSR measurement section 190 as described more fully below.

As described more fully below, the controller 180 is adapted to determine a wavelength of the input signal provided to the input 101 of the wavemeter section 100. Moreover, and as described more fully below, the controller 180 is also adapted to determine the SMSR of the input laser light.

As noted, the controller 180 comprises the processor 182, which is tangible and non-transitory, and is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 182 of the present teachings is an article of manufacture and/or a machine component. The processor 182 for the controller 180 is configured to execute software instructions to perform functions as described in the various embodiments herein. The processor 182 may be a general-purpose processor or may be part of an application specific integrated circuit (ASIC). The processor 182 may also be (or include) a microprocessor, a microcomputer, a processor chip, a controller, a microcontroller, a digital signal processor (DSP), a state machine, or a programmable logic device. The processor 182 may also be (or include) a logical circuit, including a programmable gate array (PGA) such as a field programmable gate array (FPGA), or another type of circuit that includes discrete gate and/or transistor logic. The processor 182 may be a central processing unit (CPU), a graphics processing unit (GPU), or similar processing unit, or combinations of such known processing units. Additionally, the processor 182 may comprise multiple processors, parallel processors, or both. Multiple processors may be included in, or coupled to, a single device or multiple devices.

The memory 184 may comprise a main memory or a static memory, or both, where the memories may communicate with each other via a bus (not shown). The memory 184 described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

Finally, and as will be appreciated, providing, in addition to the first MZI 120 and the second MZI 130, additional similarly configured MZIs (not shown in FIGS. 1-2), the FSRs of such additional MZIs can be determined. As will be appreciated more clearly as the present description continues, these additional MZIs and resultant FSRs will allow a greater resolution in the determination of the wavelength of the optical signal provided to the input 101.

The SMSR measurement section 190 receives the output signal from the summer 175. This signal is provided to a multiplier 199, and provides the output power 206 of the incoming laser light at 101.

The SMSR measurement section 190 also receives the output signal from the processor 182. This output signal is provided to memory element 156, which is a look-up table in which the responsivity of the first and second photodetectors 162, 164, 172, 174 versus wavelength are stored. These values, which may also be stored in memory 184 are used to calibrate the wavelength-dependent responsivity of the first and second photodetectors 162, 164, 172, 174. This calibration enables an improvement in the accuracy of the determination of the output optical power from the measured photocurrent from the first and second photodetectors 162, 164, 172, 174 to a power level at 206. Notably, the first and second photodetectors 162, 164, 172, 174 have a responsivity or conversion factor that is wavelength dependent. This conversion is effected by the controller 180. The output of photodetector 224 is connected to the multiplier circuit 231 with input 221. The input 221 is a portion of the optical signal at input 222, which includes the main laser mode. This input 222 is thus split (e.g., 50:50 or 90:10) at splitter 223, which is a one by two splitter, having input 101 and an output from a splitter 223. The output from the splitter 223 couples to a first resonator 192 and to a second resonator 191, which comprise a filter before it reaches the 304. The first and second resonators 191,192 are tuned to the output wavelength from the wavemeter section 100, and couple light of only this wavelength to respective first and second waveguides 193,197 to remove light of the output wavelength from the wavemeter section 100 (i.e., light of the input wavelength from the tunable laser under test). Stated somewhat differently, the main peak of the laser emission from the incoming laser light of the laser under test, is suppressed by a filter comprised of first and second resonators 191, 192 and first and second waveguides 193,197. The remaining part of the filtered spectrum passes to photodetector 224. Memory element 230 stores responsivity data of the photodetector 224 and may be a component of memory 184.

Multiplier circuit 231 multiplies the photocurrent from photodetector 224 to provide the actual optical power from photodetector 224. The output power from the optical signal from the multiplier 199 is subtracted by subtraction circuit 232 from the output from multiplier circuit 231, and divided by divider circuit 233. An output SMSR ratio 208 is provided such as discussed below in connection with FIG. 3. As such, in accordance with the present teachings, the SMSR can then be calculated based on the power of the main laser mode from the processor and the power of the filtered spectrum from the filter comprising first and second resonators 191, 192 and first and second waveguides 193,197. The value determined like this will be a close estimate to the classical definition of SMSR, which is based on the ratio of the optical peak power of the main laser mode over the optical peak power of the highest side-mode. In accordance with the present teachings, the measured optical powers for the main laser mode and highest side-mode are higher since not only the peak powers is measured but also the residual optical power coming from the laser's lower side-modes and/or spontaneous emission. However, the contribution of the residual optical power is negligible because they are measured in the wavemeter section 100 and the SMSR measurement section 190 and hence cancelled.

As noted above, the filter comprises first and second resonators 191, 192 and first and second waveguides 193, 197. The first and second resonators 191, 192 receive control signals from memory elements 196, 198, which, after conversion to analog signals, are used to tune the resonance wavelength of the first and second resonators 191, 192 to remove the main laser mode (the output signal from the controller 180). The wavelength dependent transmissions of first and second resonators 191, 192 are calibrated before use. Specifically, once the wavelength λ from the processor 182 is known, the wavelength to be suppressed by the first and second resonators 191, 192 are calibrated based on manufacturing (i.e., factory) calibration data to tune the first and second resonators 191, 192 to the wavelength λ (from the processor 182) to suppress optical signals of this wavelength. Notably, the first and second resonators 191, 192 comprise tuning elements 194, 195, which are adapted to tune the first and second resonators 191, 192 by known methods such as thermal, stress (e.g., piezoelectric tuner), or electro-optic effect, which are known to one of ordinary skill in the art. The wavelength from tuning elements 194, 195 is calibrated by calibration data (e.g., look-up tables) stored in by memory elements 196, 198, which, again, may be components of memory 184. These calibration data are based on known calibration data of the first and second resonators 191, 192. These calibration data are determined during fabrication of the apparatus of FIG. 1.

Figure 2:
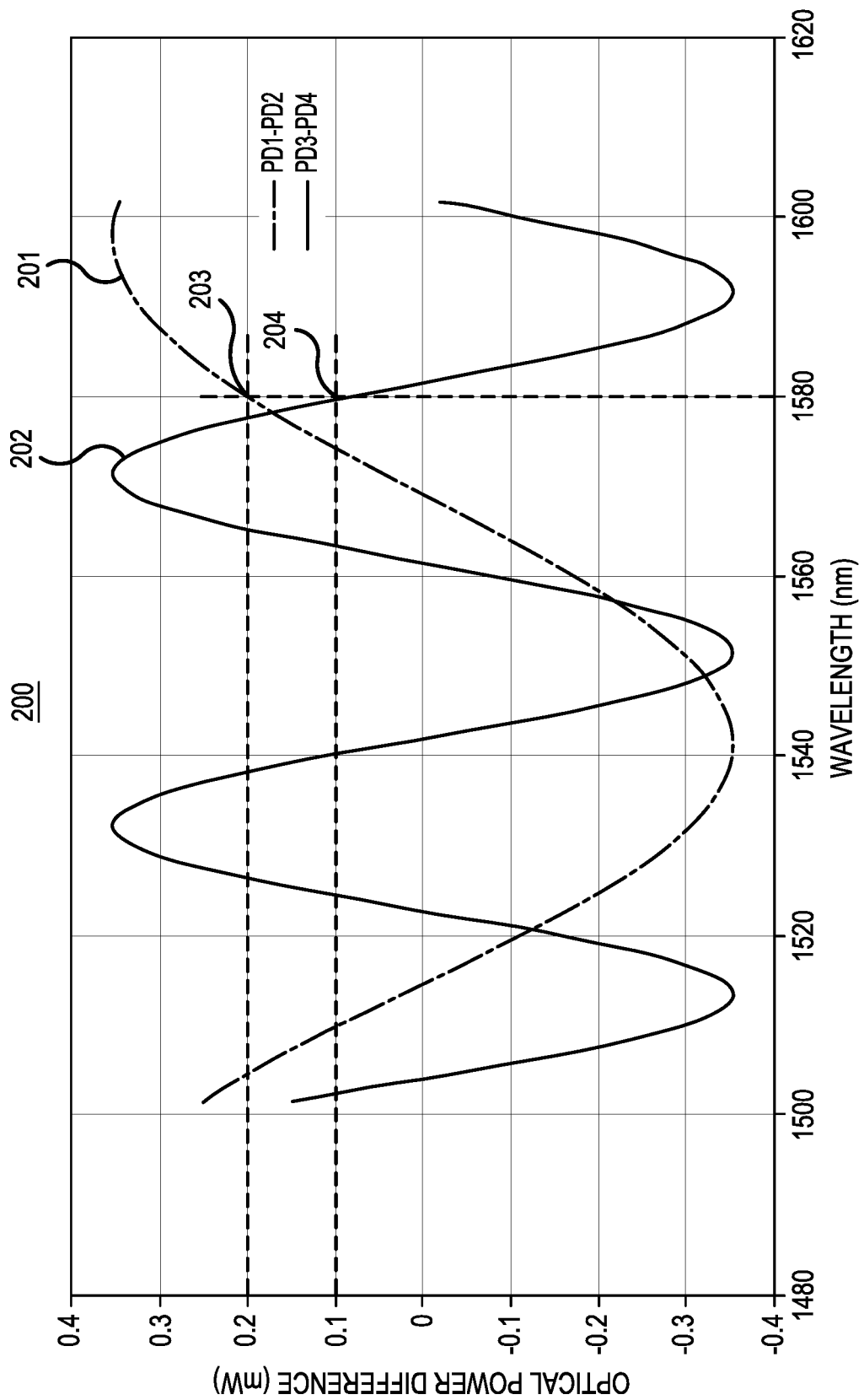
FIG. 2 is a graph of optical power versus wavelength in accordance with a representative embodiment.

FIG. 2 is a graph 200 of optical power versus wavelength in accordance with a representative embodiment. Various aspects of the wavemeter section 100 and SMSR measurement section 190 described in connection with FIG. 1 are common to the description of graph 200 and may not be repeated. Moreover, various aspects of the graph 200 will be described in greater detail below in connection with connection with the representative embodiments described in connection with FIGS. 4-5.

First curve 201 depicts the output power based on the difference signal between the first photodetector 163 and the second photodetector 164, versus wavelength. Notably, by taking the difference between the signals from first photodetector 163 and the second photodetector 164, there is no DC component of first curve 201. As will be appreciated, first curve 201 represents the spacing in optical wavelength between two successive transmitted optical intensity maxima or minima (i.e., the first FSR) of the first MZI 120 described above.

Second curve 202 depicts the output power based on the difference signal between the first photodetector 172 and the second photodetector 174, versus wavelength. Notably, by taking the difference between the signals from first photodetector 172 and the second photodetector 174, there is no DC component of second curve 202. As will be appreciated, second 202 represents the spacing in optical wavelength between two successive transmitted optical intensity maxima or minima (i.e., the second FSR) of the second MZI 130 described above.

As will be appreciated, first curve 201 has a larger spacing in optical wavelength than second 202, and thus first curve 201 has a greater FSR than the second curve. In accordance with representative embodiments, the magnitude (both absolute and relative) of first FSR (first curve 201) and the second FSR (second 202) are realized by the selection desired geometric lengths of the optical waveguides that make up the first MZI 120 and the second MZI 130. Alternatively, or additionally, the magnitudes (both absolute and relative) of first FSR (first curve 201) and the second FSR (second 202) are realized by the selection of the materials and their relative dimension to set the desired effective indices of refraction ($n_{eff}$) of the waveguides that make up the first MZI 120 and the second MZI 130. Specifically, through the selection of the lengths, and/or the materials and dimensions of the optical waveguides that make up the first MZI 120 and the second MZI 130, desired differences in the optical path lengths between the various optical waveguides that make up the first MZI 120 and the second MZI 130 enables the setting of the first FSR (first curve 201) and the second FSR (second 202).

A review of first and second curves 201, 202 reveals for each difference signal from first and second photodetectors 162, 164, and from first and second photodetectors 172, 174, each power level corresponds to a wavelength. Just by way of illustration, a power level of 0.1 mW corresponds to approximately 1510 nm and 1575 nm in first curve 201, while this power level corresponds to 1505 nm, 1525 nm, 1540 nm, 1565 nm and 1580 nm in second curve 202. Hence, the wavelength of the input optical signal at input 101 cannot be determined unambiguously based on only one of the first and second curves 201, 202.

By the present teachings, the wavelength of the optical signal provided to input 101 can be determined by measuring the difference signals (power) between first and second photodetectors 162, 164, and between first and second photodetectors 172, 174, based on the differential power measurement from the measured difference signals. By way of illustration, if the differential power signal between the first photodetector 162 and the second photodetector 164 measures 0.2 mW; and the differential power signal between the first photodetector 162 and the second photodetector 164 of the first MZI 120 measures 0.2 mW (point 203); and the differential power signal between the first photodetector 172 and the second photodetector 174 of the second MZI 130 measures 0.1 mW (point 204), the wavelength of the optical signal provided to input 101 must be 1580 nm, as this is the only wavelength that corresponds to this combination.

Notably, and as alluded to above, providing, in addition to the first MZI 120 and the second MZI 130, additional similarly configured MZIs (not shown in FIGS. 1-2), the FSRs of such additional MZIs can be determined. These additional FSRs, which are different from the FSRs of the first and second MZIs 120, 130, and from each other, additional power data versus wavelength can be determined. This allows for three or more sets of differential power signals/wavelengths can be used to provide a more accurate determination of the wavelength of the optical signal provided to input 101. Stated somewhat differently, graph 200 provides two sets of differential power/wavelengths, and thus the resolution and the unambiguous wavelength range is limited to that which can be determined based on the two sets of differential power/wavelengths. Adding a third (or more) set of differential power/wavelength data allows each wavelength to be determined more accurately or has a larger unambiguous wavelength, or both, since each determined wavelength will require three (or more) data sets to be determined.

In accordance with a representative embodiment, the data from first curve 201 and second curve can be stored in memory 184 in the controller 180 shown in FIG. 1. During a measurement of the wavelength of an optical signal provided at the input 101, measurement data are received from the first and second subtractors 166, 176 by the processor 182 of the controller 180. As noted above, memory 184 stores instructions, and processor 182 that executes the instructions. When executed by the processor 182, the instructions cause the controller 180 implement a process of comparing the first and second difference signals (power) from the first and second subtractors 166, 176 with first and second difference values stored in the memory 184. Based on the comparing, the processor 182 determines an output wavelength of the light source that provides the input optical signal to the input 101. Again, the use of two MZIs is merely illustrative. By providing a third (or more) MZIs with a third (or more) FSRs using principles of the present teachings, additional difference power signals from the third (or more) subtractors (not shown in FIGS. 1-2) can be added to increase the resolution or the unambiguous wavelength range, or both of the measurement of the wavelength of the optical signal provided by an optical source (not shown) to the input 101.

Figure 3:
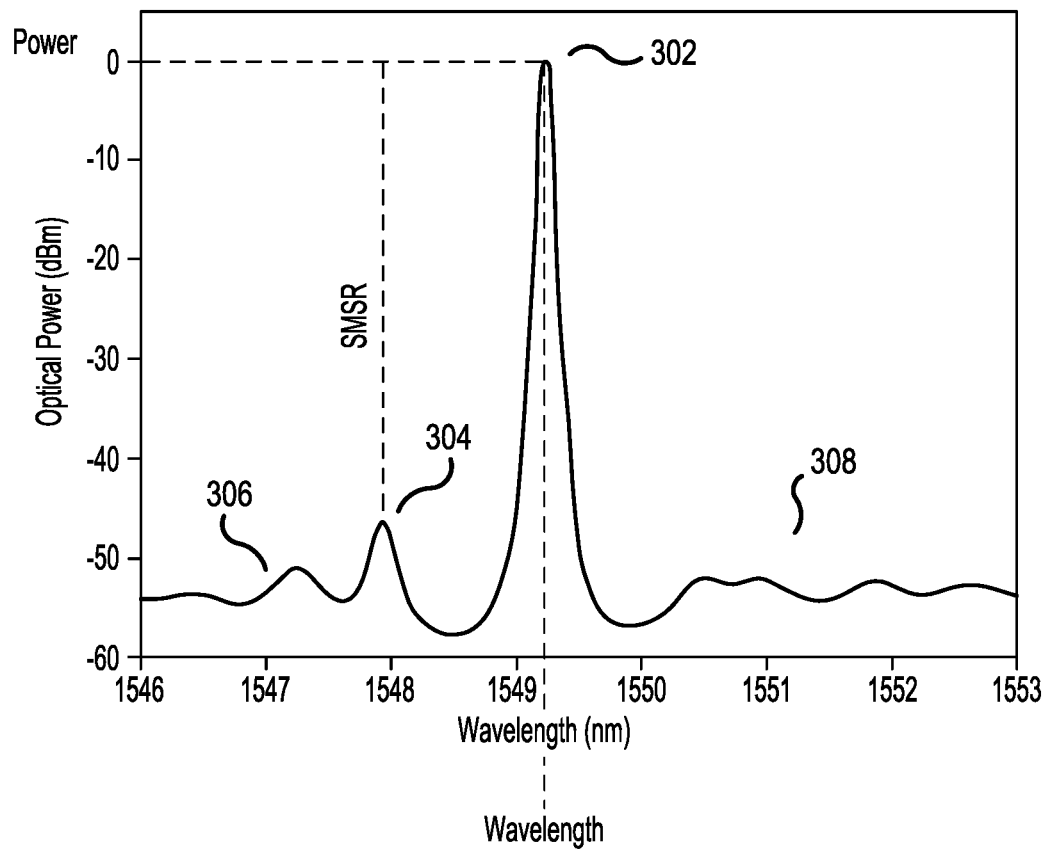
FIG. 3 is a graph of optical power versus wavelength showing main modes and side modes of a laser in accordance with a representative embodiment.

FIG. 3 is a graph 300 of optical power versus wavelength in accordance with a representative embodiment. Various aspects of the wavemeter section 100 and SMSR measurement section 190 described in connection with FIG. 1 are common to the description of graph 300 and may not be repeated.

As shown, the main laser mode 302 has a power level that is considerably higher than the lower order modes shown in regions 306, 308 of the input from the laser under test. Furthermore, a dominant side mode 304 is also shown. By the present teachings, the SMSR at the wavelength of the main laser mode 302 of the laser under test is also determined using the SMSR measurement section 190 described more fully above. Moreover, the optical power of the main laser mode at wavelength of the main laser mode 302 is determined from the output of the summer 175 as described above.

Figure 4:
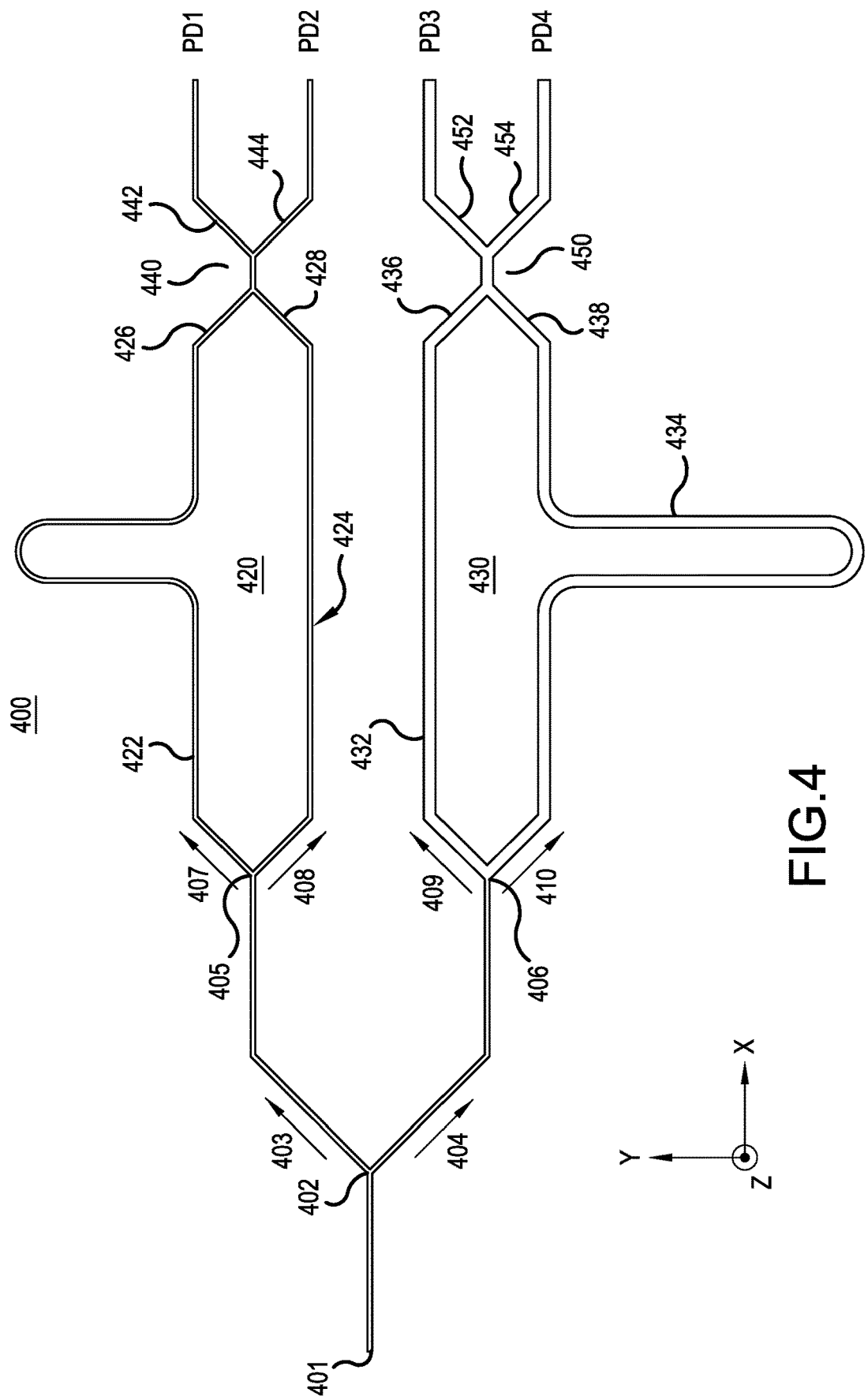
FIG. 4 is a top view of an optical wavemeter in accordance with a representative embodiment.
Figure 5:
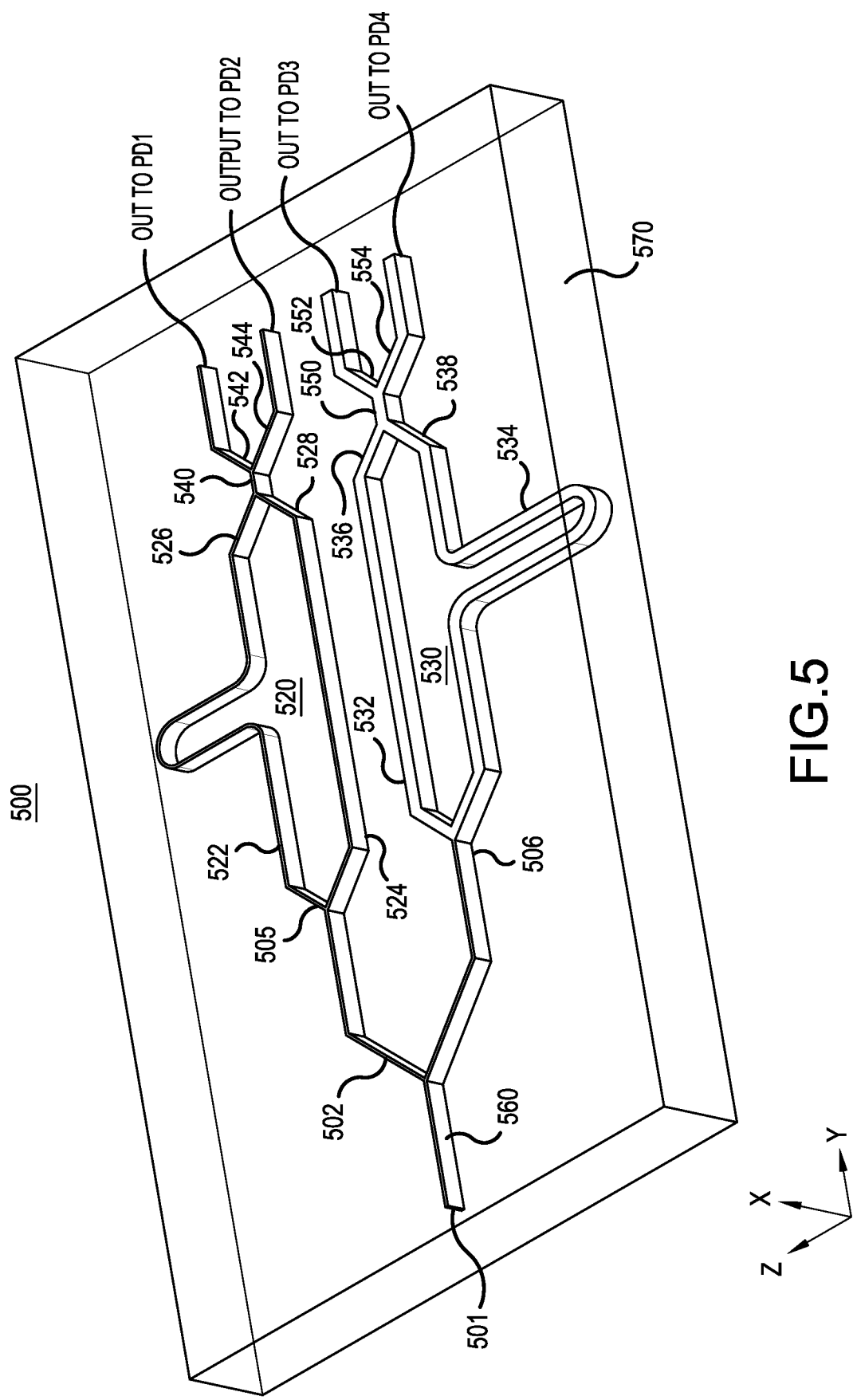
FIG. 5 is a perspective view of the optical waveguide according to the representative embodiment of FIG. 4.

FIG. 4 is a top view of an optical wavemeter 400 in accordance with a representative embodiment. Notably, and as will become clearer from a review of the description of the representative embodiments described in connection with FIG. 4, the optical wavemeter 400 is a PIC.

Among other benefits, the PIC optical wavemeter of the representative embodiments is more stable than a bulk-optic solution when exposed to environmental factors such as temperature-changes, changes in ambient pressure or composition of the media between the bulk-optical elements, shock, and vibration because the optical signals traversing the optical wavemeter 400 are guided within the chip rather than through several bulk-optic components. By contrast, bulk optical elements could, for example, move with respect to each other when the bulk optical wavemeter is dropped. Alternatively, the refractive index of air and the bulk-optic components might change differently when temperature changes and have an unpredictable impact on the FSR of the MZI in which they are disposed.

Many aspects of representative embodiments described in connection with FIGS. 1 and 2 are common to the description of optical wavemeter 400. Moreover, various aspects of the optical wavemeter 400 will be described below in connection with the representative embodiment described in connection with FIG. 5.

An input optical signal is provided to an input 401 as shown. A first optical splitter 402 is adapted to split the power of the input optical signal into a first optical signal 403 and a second optical signal 404, having equal power. As such, the first optical splitter is a 50:50 optical splitter.

The first optical signal 403 is then incident on a second optical splitter 405, and the second optical signal 404 is incident on a third optical splitter 406. Like the first optical splitter 402, the second and third optical splitters 405, 406 are each 50:50 splitters, and as such, the input optical signal is again equally split by the second and third optical splitters 405, 406. The second optical splitter 405 provides a first output optical signal 407 and a second output optical signal 408. Similarly, the third optical splitter 406 provides a third output optical signal 409 and a fourth output optical signal 410. As will be appreciated, neglecting power loss in optical waveguides and couplers, each of the first, second, third and fourth optical output signals have one-fourth of the optical power of the input optical signal provided to the input 401.

The first output optical signal 407 is received at a first port of a first arm 422 of a first Mach-Zehnder interferometer (MZI) 420; and the second output optical signal 408 is received at a second port of a second arm 424 of the first MZI 420.

Similarly, the third output optical signal 409 is received at a first port of a first arm 432 of a second Mach-Zehnder interferometer (MZI) 430; and the fourth output optical signal is received at a second port of a second arm 434 of the second MZI 430.

A first output 426 and a second output 428 are provided from the first and second arms 422, 424 of the first MZI 420 to first and second inputs of a first signal combiner 440, which provides a first output 442 to a first photodetector PD1 and a second output 444 to a second photodetector PD2.

A first output 436 and a second output 438 are provided from the first and second arms 432, 434 of the second MZI 430 to first and second inputs of a second signal combiner 450, which provides a first output 452 to a third photodetector PD3 and a second output 454 to a fourth photodetector PD4.

In a manner described more fully above, the outputs of the photodetectors PD1, PD2, PD3 and PD4 are provided to respective subtractors (not shown in FIG. 4), and difference signals (power) are provided in to a controller (not shown in FIG. 4) for further processing as described above.

The first MZI 420 has a first free-spectral range (FSR), and the second MZI 430 has a second free spectral range, which is different than the first FSR of the first MZI 420. In accordance with a representative embodiment the FSRs of the first and second MZIs 420, 430 are realized by providing a first effective index of refraction for the first MZI 420, and a second effective index of refraction for the second MZI 430, which is not the same as the first effective index of refraction. There are various ways contemplated by the present teachings to provide a desired difference in the first effective index of refraction for the first MZI 420, and a second effective index of refraction for the second MZI 430. One way of providing the desired effective indices of refraction is by selection of the dimensions (width—y-direction in the coordinate system of FIG. 4) and height (+z-direction in the coordinate system of FIG. 4) of the cores of the optical waveguides that make up the first and second MZIs 420, 430. To this end, and as will become clearer through the description of the representative embodiments described in connection with FIG. 4, each optical waveguide has a core and a cladding. When the width, or a height, or both of a core in one MZI is greater than a width, or height, or both, of another MZI, a smaller fraction of the electromagnetic field profile of the guided mode overlaps the cladding, and more overlaps the core. This results in a comparatively higher effective index of refraction for the mode traversing the wider and/or taller core.

It can be shown that the FSR of an MZI is given by:

$$FSR = \frac{\lambda^2}{2 * n_{eff} \Delta L}$$

where $\lambda$ is the wavelength of the optical signal traversing the MZI, $n_{eff}$ is the effective index of refraction of the waveguides (at wavelength $\lambda$) of the first and second arms of the MZI, and $\Delta L$ is the difference in the geometric length of the optical waveguide in the first arm and the waveguide of the second arm of the MZI.

Just by way of illustration, optical waveguides in the first MZI 420 illustratively have a width of 400 nm provides first curve 201 in FIG. 2; whereas the optical waveguides of the second MZI 430 has a width of 550nm and provides second 202 in FIG. 2. As such, by selecting the width of the optical waveguides in the first MZI 420 to smaller than the width of the optical waveguides of the second MZI 430, the effective index of refraction of the first MZI 420 is smaller than effective index of refraction of the second MZI 430. From the equation above, the first MZI has a greater FSR (as shown in first curve 201) than the second MZI 430 (as shown in second 202).

The selection of differing widths and/or height for the waveguides in each MZI are illustrative ways to provide different effective indices of refraction in each MZI, and as a result are ways to provide MZIs with different FSRs in a PIC. Alternatively, materials used for the core and cladding of the waveguides of respective MZIs can be selected to provide different effective indices of refraction for waveguides that form the MZI. For example, the core/cladding for the optical waveguides of representative embodiments can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

In addition, or instead of the providing different effective indices of refraction, the first MZI 420 may have a first geometric optical length (i.e., physical length) and the second MZI 430 may have a second geometric optical length, which is different than the first geometric optical length. To this end, as can be seen the geometric optical length of first arm 422 of the first MZI 420 is greater than the geometric optical length of second arm 424 of the first MZI 420. As such, the FSR of the first MZI 420 is a first value. Similarly, the geometric optical length of first arm 432 of the second MZI 430 is greater than the geometric optical length of second arm 434 of the second MZI 430. As will be appreciated from the equation above, the FSR of an MZI can be increased by decreasing the geometric optical path length difference between the first and second arms of the MZI. Increasing the geometric optical path length difference will lead to a smaller FSR.

FIG. 4 is a perspective view of an optical wavemeter 500 in accordance with a representative embodiment. As will be appreciated, the optical wavemeter 500 is a PIC.

Among other benefits, the PIC optical wavemeter of the representative embodiments are is more stable than a bulk-optic solution when exposed to environmental factors such as temperature-changes, shock, and vibration because the optical signals traversing the optical wavemeter 500 are guided within the chip rather than through several bulk-optic components. By contrast, bulk optical elements can move could, for example, move with respect to each other when the bulk optical wavemeter is dropped. Alternatively, the refractive index of air and the bulk-optic components might change differently when temperature changes and have an unpredictable impact on the FSR of the MZI in which they are disposed.

Many aspects of representative embodiments described in connection with FIGS. 1-4 are common to the description of optical wavemeter 500 and may not be repeated.

An input optical signal is provided to an input 501 as shown. A first optical splitter 502 is adapted to split the power of the input optical signal into a first optical signal 503 and a second optical signal 504, having equal power. As such, the first optical splitter is a 50:50 optical splitter.

The first optical signal 503 is then incident on a second optical splitter 505, and the second optical signal 504 is incident on a third optical splitter 506. Like the first optical splitter 502, the second and third optical splitters 505, 506 are each 50:50 splitters, and as such, the input optical signal is again equally split by the second and third optical splitters 505, 506. As will be appreciated, neglecting power loss in optical waveguides and couplers, each of the first, second, third and fourth optical output signals have one-fourth of the optical power of the input optical signal provided to the input 501.

The first output optical signal 507 is received at a first port of a first arm 522 of a first Mach-Zehnder interferometer (MZI) 520; and the second output optical signal 508 is received at a second port of a second arm 524 of the first MZI 520.

Similarly, the third output optical signal 509 is received at a first port of a first arm 532 of a second Mach-Zehnder interferometer (MZI) 530; and the fourth output optical signal is received at a second port of a second arm 534 of the second MZI 530.

A first output 526 and a second output 528 are provided from the first and second arms 522, 524 of the first MZI 520 to first and second inputs of a first signal combiner 540, which provides a first output 542 to a first photodetector PD1 and a second output 544 to a second photodetector PD2.

A first output 536 and a second output 538 are provided from the first and second arms 532, 534 of the second MZI 530 to first and second inputs of a second signal combiner 550, which provides a first output 552 to a third photodetector PD3 and a second output 554 to a fourth photodetector PD4.

In a manner described more fully above, the outputs of the photodetectors PD1, PD2, PD3 and PD4 are provided to respective subtractors (not shown in FIG. 3), and difference signals (power) are provided in to a controller (not shown in FIG. 3) for further processing as described above.

The first MZI 520 has a first free-spectral range (FSR), and the second MZI 530 has a second free spectral range, which is different than the first FSR of the first MZI 520. In accordance with a representative embodiment the FSRs of the first and second MZIs 520, 530 are realized by providing a first effective index of refraction for the first MZI 520, and a second effective index of refraction for the second MZI 530, which is not the same as the first effective index of refraction. There are various ways contemplated by the present teachings to provide a desired difference in the first effective index of refraction for the first MZI 520, and a second effective index of refraction for the second MZI 530.

As will be appreciated, the optical wavemeter 500 comprises a series of connected optical waveguides as described herein. In accordance with a representative embodiment, the optical waveguides in the wavemeter are strip waveguides which consist of a channel (core) made of a material having a higher index of refraction disposed in/surrounded by a material (cladding) having a lower index of refraction than the channel. In accordance with a representative embodiment, the waveguides of the optical wavemeter 500 may comprise a core 560, which is illustratively silicon, disposed in a cladding 570 of silicon dioxide, which may be disposed on a silicon substrate. As noted above, the optical wavemeter 500 of various embodiments may be implemented in any material system in which a waveguide can be built. For example, as noted above, the core 560/cladding 570 for the strip waveguide can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

As noted above, one way of providing the desired effective indices of refraction is by selection of the dimensions (width—z-direction in the coordinate system of FIG. 5) and height (+x-direction in the coordinate system of FIG. 5) of the cores of the optical waveguides that make up the first and second MZIs 520, 530. To this end, and as will become clearer through the description of the representative embodiments described in connection with FIG. 5, each optical waveguide has a core and a cladding. When the width, or a height, or both of a core in one MZI is greater than a width, or height, or both, of another MZI, less energy of the guided mode overlaps the cladding, and more overlaps the core. This results in a comparatively higher effective index of refraction for the mode traversing the wider and/or taller core.

Just by way of illustration, optical waveguides in the first MZI 520 illustratively have a width of 400 nm provides first curve 201 in FIG. 2; whereas the optical waveguides of the second MZI 530 has a width of 550*nm* and provides second 202 in FIG. 2. As such, by selecting the width of the optical waveguides in the first MZI 520 to smaller than the width of the optical waveguides of the second MZI 530, the effective index of refraction of the first MZI 520 is smaller than effective index of refraction of the second MZI 530. From the equation above, the first MZI has a greater FSR (as shown in first curve 201) than the second MZI 530 (as shown in second 202).

The selection of differing widths and/or height for the waveguides in each MZI are illustrative ways to provide different effective indices of refraction in each MZI, and as a result are ways to provide MZIs with different FSRs in a PIC. Alternatively, materials used for the core and cladding of the waveguides of respective MZIs can be selected to provide different effective indices of refraction for waveguides that form the MZI. For example, the core disposed in the cladding for the optical waveguides of representative embodiments can be combinations of silicon (Si), silicon dioxide ($SiO_2$), silicon nitride ($Si_3N_4$); or doped indium phosphide (InP) and in undoped indium phosphide. These material systems are merely illustrative, and other materials systems may be incorporated without departing from the scope of the present teachings.

In addition, or instead of the providing different effective indices of refraction, the first MZI 520 may have a first geometric optical length (i.e., physical length) and the second MZI 530 may have a second geometric optical length, which is different than the first geometric optical length. To this end, as can be seen the geometric optical length of first arm 522 of the first MZI 520 is greater than the geometric optical length of second arm 524 of the first MZI 520. As such, the FSR of the first MZI 520 is a first value. Similarly, the geometric optical length of first arm 532 of the second MZI 530 is greater than the geometric optical length of second arm 534 of the second MZI 330. Again, as will be appreciated from the equation above, the FSR of an MZI can be increased by decreasing the geometric optical path length difference between the first and second arms of the MZI. Increasing the geometric optical path length difference will lead to a smaller FSR.

Figure 6:
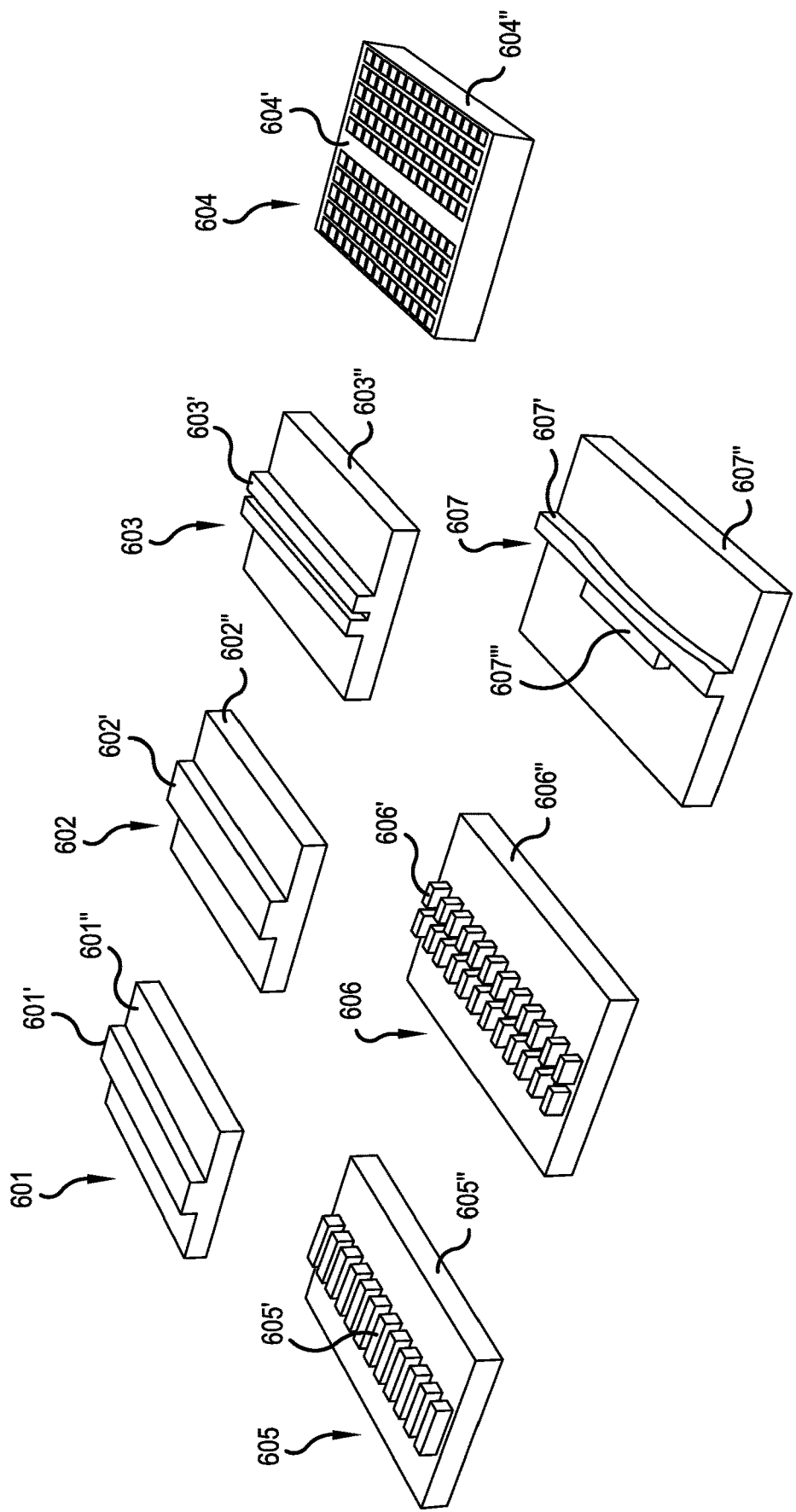
FIG. 6 shows perspective views of illustrative types of optical waveguides contemplated for use in connection with various representative embodiments.

FIG. 6 shows perspective views of illustrative types of optical waveguides contemplated for use in connection with various representative embodiments. Again, many aspects of representative embodiments described in connection with FIGS. 1-5 are common to the description of the optical waveguides of representative embodiments of FIG. 6, and may not be repeated.

At the outset, each of the optical waveguides 601, 602, 603, 604, 605, 606, and 607, comprise cores that are disposed over a suitable cladding material. Additional cladding material that is contemplated to be disposed over and on sides of each of the cores of optical waveguides 60~1607 is not shown to foster a better view of the respective cores. So, with reference to FIG. 4, the cladding material would substantially surround the respective cores, like cladding 470 of FIG. 4 substantially surrounds core 460. Moreover, as noted above, the cores and claddings of the optical waveguides 601, 602, 603, 604, 605, 606, and 607 can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

FIG. 6 depicts a strip optical waveguide 601 comprising a core 601' and disposed over a cladding 601".

Another contemplated optical waveguide is rib optical waveguide 602, comprising a core 602' and disposed over a cladding 603".

Another contemplated optical waveguide is slot optical waveguide 603, comprising two cores 603' that are filled with a third material and disposed over a cladding 603".

Another contemplated optical waveguide is photonic crystal waveguide optical waveguide 604, comprising a core 604' and disposed over a cladding 604".

Another contemplated optical waveguide is subwavelength grating (SWG) optical waveguide 605, comprising a core 605' and disposed over a cladding 605".

Another contemplated optical waveguide is SWG slot waveguide optical waveguide 606, comprising a core 606' and disposed over a cladding 606".

Another contemplated optical waveguide is surface plasmon polariton (SPP) slot optical waveguide 607, comprising a core 607' disposed adjacent to metal layer 607''' and disposed over a cladding 607".

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. An apparatus for determining a wavelength, a power, and a side-mode suppression ratio of an input signal of an input signal, the apparatus comprising:
   a first optical splitter adapted split power of the input optical signal into a first output optical signal and a second output optical signal;
   a second optical splitter connected to a first arm of the first optical splitter, and adapted to split the first output optical signal into a third output optical signal and a fourth optical signal;
   a wavelength and power measurement stage connected to the second output optical splitter, the wavelength and power measurement stage comprising: a first Mach-Zehnder Interferometer (MZI) disposed over the substrate, comprising first optical waveguides having a first effective index of refraction and configured to receive the third output optical signal from a light source; and a second Mach-Zehnder Interferometer (MZI) disposed over the substrate, comprising second optical waveguides having a second effective index of refraction, which is greater than the first effective index of refraction, and configured to receive the fourth output optical signal from the light source, wherein the first MZI has a first optical path length (OPL) difference, the second MZI has a second optical path length (OPL) difference, which is greater than the first OPL difference; and
   a side mode suppression stage adapted to receive the second output optical signal, the side mode suppression stage comprising: a filter adapted to suppress a primary laser mode of the second output optical signal and to pass a remaining portion of the second output signal to determine a side mode suppression ratio (SMRS) based on an optical power of the main laser mode from the wavelength and power measurement stage, and an optical power of the remaining portion of the second output optical signal.

2. The apparatus of claim 1, wherein the filter comprises a single resonant structure, or cascaded resonant structures.

3. The apparatus of claim 2, wherein the single or cascaded resonant structures comprise a ring resonator, a Fabry-Perot etalon, or a Bragg grating.

4. The apparatus of claim 1, wherein the filter comprises an interferometric filter.

5. The apparatus of claim 4, wherein the interferometric filter comprises an MZI.

6. The apparatus of claim 1, wherein the filter comprises a wavelength absorbing device tuned to the wavelength of the primary laser mode.

7. The apparatus of claim 1, wherein the filter is thermally tunable, stress tunable, or electro-optically tunable.

8. The apparatus of claim 1, wherein the first optical waveguides have a first core width, the second optical waveguides have a second core width, and the second core width is greater than the first core width.

9. The apparatus of claim 1, wherein the first optical waveguides have a first core height, the second optical waveguides have a second core height, and the second core height is greater than the first core height.

10. The apparatus of claim 1, wherein the first and second optical waveguides are each one of a strip optical waveguide, a rib optical waveguide, a slot optical waveguide, a photonic crystal optical waveguide, a subwavelength grating (SWG) optical waveguide, a slot SWG optical waveguide, and a surface plasmon polariton slot optical waveguide.

11. The apparatus of claim 1, wherein geometric length difference of the arms of the first MZI is not the same as the geometric length difference of the arms of the second MZI.

12. The apparatus of claim 1, wherein the second optical waveguides comprise a second core substantially surrounded by a second cladding, wherein an index of refraction of the second core is greater than an index of refraction of the second cladding.

13. The apparatus of claim 1, further comprising:
    a first photodetector and a second photodetector, wherein a first difference signal is provided based on first outputs of the first MZI; and
    a third photodetector and a fourth photodetector, wherein a second difference signal is provided based on second outputs of the second MZI, wherein the first and second difference signals are used to determine an output wavelength of the light source.

14. An optical wavemeter for determining an optical wavelength a power, and a side-mode suppression ratio of an input signal of a light source, the optical wavemeter comprising:
    a first optical splitter adapted split power of the input optical signal into a first output optical signal and a second output optical signal;
    a second optical splitter connected to a first arm of the first optical splitter, and adapted to split the first output optical signal into a third output optical signal and a fourth optical signal;
    a wavelength and power measurement stage connected to the second output optical splitter, the wavelength and power measurement stage comprising: a first Mach-Zehnder Interferometer (WI) disposed over the substrate, comprising first optical waveguides having a first optical path length difference, and configured to receive a first output optical signal from a light source; a second Mach-Zehnder Interferometer (MZI) disposed over the substrate, comprising second optical waveguides having a second optical path length difference, which is greater than the first optical path length difference, and configured to receive a second output optical signal from the light source; a first photodetector and a second photodetector, wherein a first difference signal is provided based on first outputs of the first MZI; a third photodetector and a fourth photodetector, wherein a second difference signal is provided based on second outputs of the second MZI;
    a side mode suppression stage adapted to receive the second output optical signal, the side mode suppression stage comprising: a filter adapted to suppress a primary laser mode of the second output optical signal and to pass a remaining portion of the second output signal; and
    a controller comprising a memory that stores instructions, and a processor that executes the instructions, wherein, when executed by the processor, the instructions cause the controller to: compare the first and second difference signals with first and second difference values stored in the memory, and, based on the comparing, determine an output wavelength of the light source;
    and determine a side mode suppression ratio (SMRS) based on an optical power of the main laser mode from the wavelength and power measurement stage, and an optical power of the remaining portion of the second output optical signal; determining the SMRS.

15. The apparatus of claim 14, wherein the filter comprises a single resonant structure, or cascaded resonant structures.

16. The apparatus of claim 15, wherein the single or cascaded resonant structures comprise a ring resonator, a Fabry-Perot etalon, or a Bragg grating.

17. The apparatus of claim 14, wherein the filter comprises an interferometric filter.

18. The apparatus of claim 17, wherein the interferometric filter comprises an MZI.

19. The apparatus of claim 14, wherein the filter comprises a wavelength absorbing device tuned to the wavelength of the primary laser mode.

20. The apparatus of claim 14, wherein the filter is thermally tunable, stress tunable, or electro-optically tunable.

* * * * *